US010607632B2

(12) United States Patent
Sudo

(10) Patent No.: US 10,607,632 B2
(45) Date of Patent: Mar. 31, 2020

(54) ABNORMAL SOUND DETECTION APPARATUS AND DETECTION METHOD

(71) Applicant: HONDA MOTOR CO., LTD., Tokyo (JP)

(72) Inventor: Yui Sudo, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/354,804

(22) Filed: Mar. 15, 2019

(65) Prior Publication Data

US 2019/0295567 A1 Sep. 26, 2019

(30) Foreign Application Priority Data

Mar. 20, 2018 (JP) ................................. 2018-053563

(51) Int. Cl.
*H04R 29/00* (2006.01)
*G10L 25/51* (2013.01)
*G10L 25/18* (2013.01)

(52) U.S. Cl.
CPC .............. *G10L 25/51* (2013.01); *G10L 25/18* (2013.01); *H04R 29/00* (2013.01)

(58) Field of Classification Search
CPC .... H04R 29/00; H04R 29/001; H04R 29/002; H04R 29/003; H04R 29/004; H04R 29/005; H04R 29/006; H04R 29/008; G10L 25/18; G10L 25/51
USPC ................ 381/56, 58, 86, 94.1–94.3, 80, 97
See application file for complete search history.

(56) References Cited

U.S. PATENT DOCUMENTS

| | | | | |
|---|---|---|---|---|
| 4,549,289 A | * | 10/1985 | Schwartz | G01H 7/00 369/53.1 |
| 5,537,479 A | * | 7/1996 | Kreisel | H04R 1/02 381/89 |
| 5,551,298 A | * | 9/1996 | Rayment | G01M 7/025 73/579 |
| 6,101,432 A | * | 8/2000 | Her | G01M 17/007 700/280 |
| 6,168,568 B1 | * | 1/2001 | Gavriely | A61B 5/087 600/529 |
| 7,995,772 B2 | * | 8/2011 | Steinberg | G01H 3/00 381/94.3 |

(Continued)

FOREIGN PATENT DOCUMENTS

JP 2012-242214 12/2012

*Primary Examiner* — Xu Mei
(74) *Attorney, Agent, or Firm* — Rankin, Hill & Clark LLP

(57) ABSTRACT

In detecting abnormal sound of a test object such as a vehicle immediately after completion of vehicle assembly, a reference sound data is recorded as reference data having phase and amplitude in each of multiple frequency bands reference sounds of types not previously recorded as abnormal sounds in the test object similar to the test object, test sound data is acquired which has phase and amplitude in the multiple frequency bands from test sounds generated by the test object. And sound feature data is acquires by comparing the test sound data with reference sound data in frequency bands the same as the multiple frequency bands and by changing amplitude of the test sound data based on amplitude of the reference sound data while maintaining phase of the test sound data, and abnormal sound is detected based on the acquired sound feature data.

18 Claims, 11 Drawing Sheets

(56) References Cited

U.S. PATENT DOCUMENTS

| | | | | |
|---|---|---|---|---|
| 8,275,151 | B2* | 9/2012 | Caramma | H04R 3/00 |
| | | | | 381/56 |
| 8,885,848 | B2* | 11/2014 | Takechi | G01M 13/028 |
| | | | | 381/56 |
| 10,101,242 | B2* | 10/2018 | Lim | G01H 13/00 |
| 10,475,469 | B2* | 11/2019 | Sudo | G10L 25/18 |
| 2004/0190928 | A1* | 9/2004 | Tsunoda | G01N 1/2202 |
| | | | | 399/91 |
| 2006/0140413 | A1* | 6/2006 | Abe | G10L 17/26 |
| | | | | 381/56 |
| 2006/0171546 | A1* | 8/2006 | Bungenberg | H04R 29/00 |
| | | | | 381/86 |
| 2013/0030818 | A1* | 1/2013 | Yamamoto | G10L 19/0204 |
| | | | | 704/500 |
| 2014/0369509 | A1* | 12/2014 | Fukamachi | G01S 13/93 |
| | | | | 381/56 |
| 2016/0379664 | A1* | 12/2016 | Chen | H04R 1/326 |
| | | | | 381/94.3 |

\* cited by examiner

ABNORMAL SOUND DETECTION APPARATUS AND DETECTION METHOD

CROSS-REFERENCE TO RELATED APPLICATION

This application is based upon and claims the benefit of priority from Japanese Patent Application No. 2018-053563 filed on Mar. 20, 2018, the contents of which are incorporated herein by reference.

BACKGROUND OF THE INVENTION

Field of the Invention

This invention relates to an abnormal sound detection apparatus and an abnormal sound detection method, particular to a detection apparatus and detection method for detecting abnormal sound immediately after completion of vehicle assembly.

Abnormal sound of a vehicle after completion of assembly is ordinarily inspected (tested) by listening to whether abnormal sound in interior noise (inside passenger compartment) arising other than that occurs during ordinary running when an inspector causes the vehicle body to be forcibly vibrated by driving the vehicle on a rough road such as a Belgian block (cobblestone) road.

As implied by the foregoing, "abnormal sound" as termed here means noise that differs from interior noise during ordinary vehicle running, i.e., differs from regular engine sound, wind sound, road noise and other interior noises heard during ordinary vehicle running, and that is noise that normally should not occur in a properly assembled vehicle, such as detached bolt rolling sound, body squeaking, or loose connector rattling.

As such inspection relying on a human inspector is affected by variance in inspector hearing ability and its workload is heavy, automatic abnormal sound detection technologies not requiring human intervention have been proposed. As one example Japanese Unexamined Patent Application No. 2012-242214A can be cited.

In the technology of the reference, a reference value representing sound pressure is obtained by averaging in-compartment sound acquired from a vehicle under inspection by frequency band. When the reference value experiences a sound burst exceeding a certain threshold value, its sound pressure level is extracted and feature (characteristic) value thereof calculated, and when the calculated feature value corresponds to some predefined abnormal sound, abnormal sound is determined to have been detected.

Although the aforesaid configuration of the reference enables to automatically detect abnormal sound, the technology cannot easily realize high accuracy abnormal sound detection because Fast Fourier Transform processing has a time-averaging effect that results in sound burst sites also being smoothed and therefore makes distinction from road noise and the like hard to bring out, and also because phase difference preservation is impossible using differences between FFT data.

SUMMARY OF THE INVENTION

An object of this invention is therefore to overcome the aforesaid problem by providing an abnormal sound detection apparatus and detection method adapted to accurately detect abnormal sound while minimizing impact of in-compartment noise arising during normal running.

In order to achieve the object, this invention provides in its first aspect an apparatus for detecting abnormal sound of a test object, comprising: a reference sound data recording unit configured to record as reference data having phase and amplitude in each of multiple frequency bands reference sounds of types not previously recorded as abnormal sounds in the test object similar to the test object; a test sound data acquisition unit configured to acquire test sound data having phase and amplitude in the multiple frequency bands from test sounds generated by the test object; a sound feature data acquisition unit configured to acquire sound feature data by comparing the test sound data with reference sound data in frequency bands the same as the multiple frequency bands and by changing amplitude of the test sound data based on amplitude of the reference sound data while maintaining phase of the test sound data; and an abnormal sound detection unit configured to detect abnormal sound based on the acquired sound feature data.

In order to achieve the object, this invention provides in its second aspect a method for detecting abnormal sound of a test object, comprising the steps of: recording as reference data having phase and amplitude in each of multiple frequency bands reference sounds of types not previously recorded as abnormal sounds in the test object similar to the test object; acquiring test sound data having phase and amplitude in the multiple frequency bands from test sounds generated by the test object; acquiring sound feature data by comparing the test sound data with reference sound data in frequency bands the same as the multiple frequency bands and by changing amplitude of the test sound data based on amplitude of the reference sound data while maintaining phase of the test sound data; and detecting abnormal sound based on the acquired sound feature.

In order to achieve the object, this invention provides in its third aspect an apparatus for detecting abnormal sound of a test object, comprising: an electronic control unit constituted of a microcomputer equipped with at least one processor and one memory coupled to the processor; wherein the processor is configured to: record as reference data having phase and amplitude in each of multiple frequency bands reference sounds of types not previously recorded as abnormal sounds in the test object similar to the test object; acquire test sound data having phase and amplitude in the multiple frequency bands from test sounds generated by the test object; acquire sound feature data by comparing the test sound data with reference sound data in frequency bands the same as the multiple frequency bands and by changing amplitude of the test sound data based on amplitude of the reference sound data while maintaining phase of the test sound data; and detect abnormal sound based on the acquired sound feature data.

BRIEF DESCRIPTION OF THE DRAWINGS

The objects and advantages of the present invention will become clearer from the following description of embodiments in relation to the attached drawings, in which.

DETAILED DESCRIPTION OF THE INVENTION

In the following, the abnormal sound detection apparatus and detection method according to an embodiment of this invention are explained with reference to the attached drawings.

Figure 1:
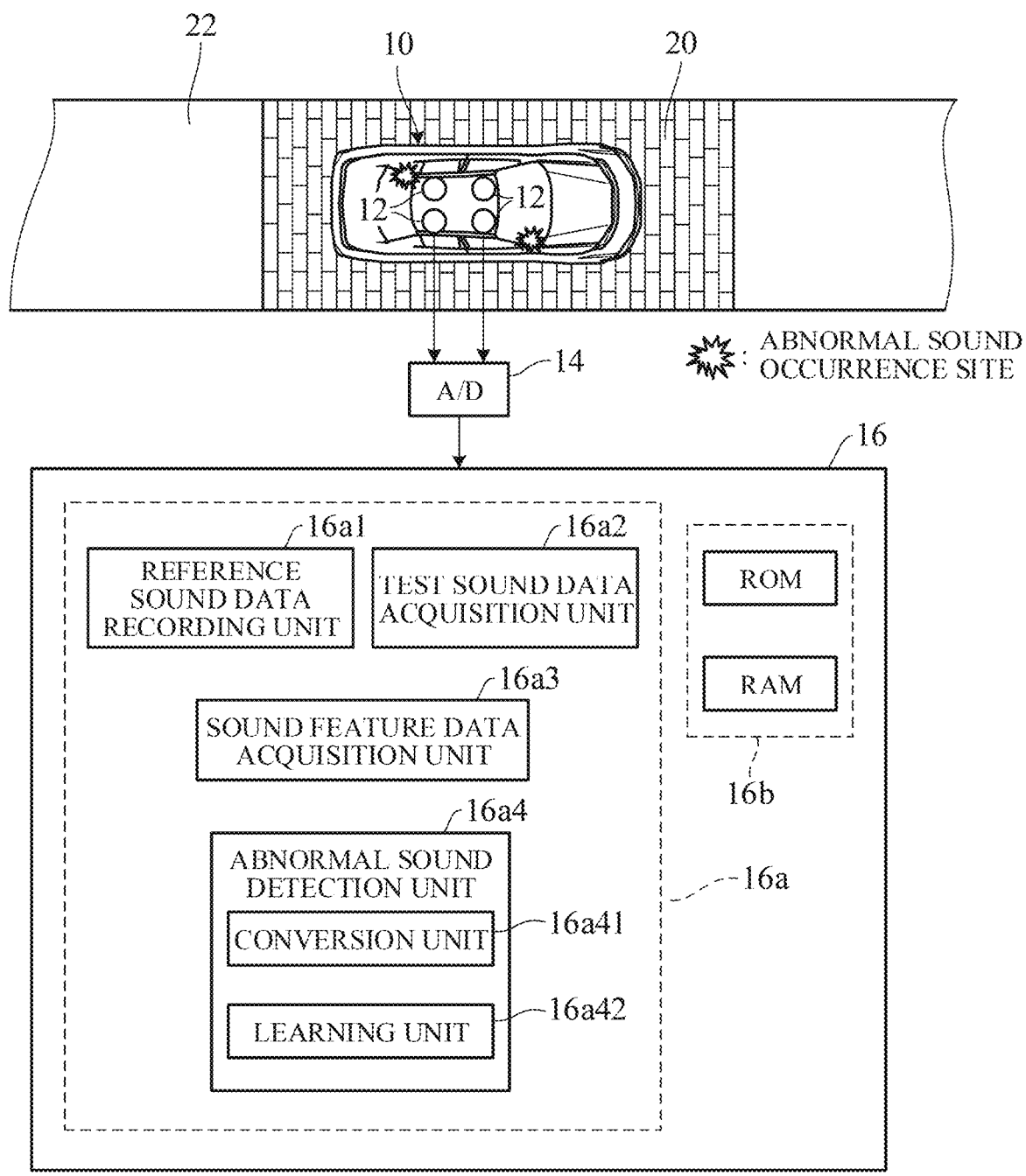
FIG. 1 is a schematic diagram generally illustrating an abnormal sound detection apparatus according to an embodiment of this invention.

FIG. 1 is a schematic diagram generally illustrating an abnormal sound detection apparatus according to this embodiment.

As shown in the drawing, the abnormal sound detection apparatus, which is installed in a test vehicle 10 for test or inspection, specifically in a passenger compartment (interior) of the vehicle 10 immediately after completion of assembly at a manufacturing plant, has four microphones 12, an A/D conversion circuit 14 configured to A/D-convert each of four channel sound signals outputted from the microphones 12 to a digital signal, and an electronic control unit (ECU) 16 that receives output from the A/D conversion circuit 14 as input.

In this embodiment, when an inspector drives the vehicle 10 on a predetermined test track 22 including a Belgian block (cobblestone) road or other such rough road 20, interior noise caused by forced vibration of the vehicle frame is picked up by the microphones 12, A/D converted by the A/D conversion circuit 14, and inputted to the ECU 16 as sound data that automatically detects (inspects) whether abnormal sound different from interior noise during normal running occurs. An "abnormal sound occurrence site" is indicated in FIG. 1 as one example.

Since abnormal sound detection can be performed regardless of how the vehicle is forcibly vibrated, the detection can be alternatively performed by vibrating the vehicle 10 with a mechanical vibrator rather than by actual driving by an inspector.

The A/D conversion circuit 14 and ECU 16 are installed at a suitable location, such as in the interior (passenger compartment) of the vehicle 10. The ECU 16 is configured as a microcomputer comprising at least one processor (CPU) 16a, and at least one memory 16b such as ROM, RAM and other memory coupled to the processor 16a.

The processor 16a is adapted to operate in accordance with a program stored in the memory 16b which is configured to function, as indicated in FIG. 1, as a reference sound data recording unit 16a1, a test sound data acquisition unit 16a2, a sound feature data acquisition unit 16a3, and an abnormal sound detection unit 16a4

The reference sound data recording unit 16a1 is configured to record, as reference data having phase and amplitude in each of multiple frequency bands, reference sounds of types not previously recorded as abnormal sounds in a test object (other vehicle 10) similar to the test object concerned (vehicle 10).

"Data having phase and amplitude in each of multiple frequency bands" as termed here means FFT (fast Fourier transform) data or STFT (short-time Fourier transform) data.

The test sound data acquisition unit 16a2 is configured to acquire test sound data similarly having phase and amplitude in each of multiple frequency bands from test sounds (interior noise) generated during running of the test object (vehicle 10) on the test track 22.

The sound feature data acquisition unit 16a3 is configured to acquire sound feature data by similarly comparing test sound data with reference sound data in frequency bands the same as the multiple frequency bands, and by changing amplitude of the test sound data based on amplitude of the reference sound data, while maintaining phase of the test sound data, more specifically by changing amplitude of the test sound data based on ratio of the amplitude of test sound data to the amplitude of the reference sound data, while maintaining phase of the test sound data.

The abnormal sound detection unit 16a4 is configured to detect abnormal sound based on acquired sound feature data. The abnormal sound detection unit 16a4 comprises a conversion unit 16a41 configured to convert sound feature data acquired by the sound feature data acquisition unit 16a3 to sound feature (sound characteristic) signals and a learning unit 16a42 configured to perform machine-learning sound signals of sound features converted by the conversion unit 16a41.

Figure 2:
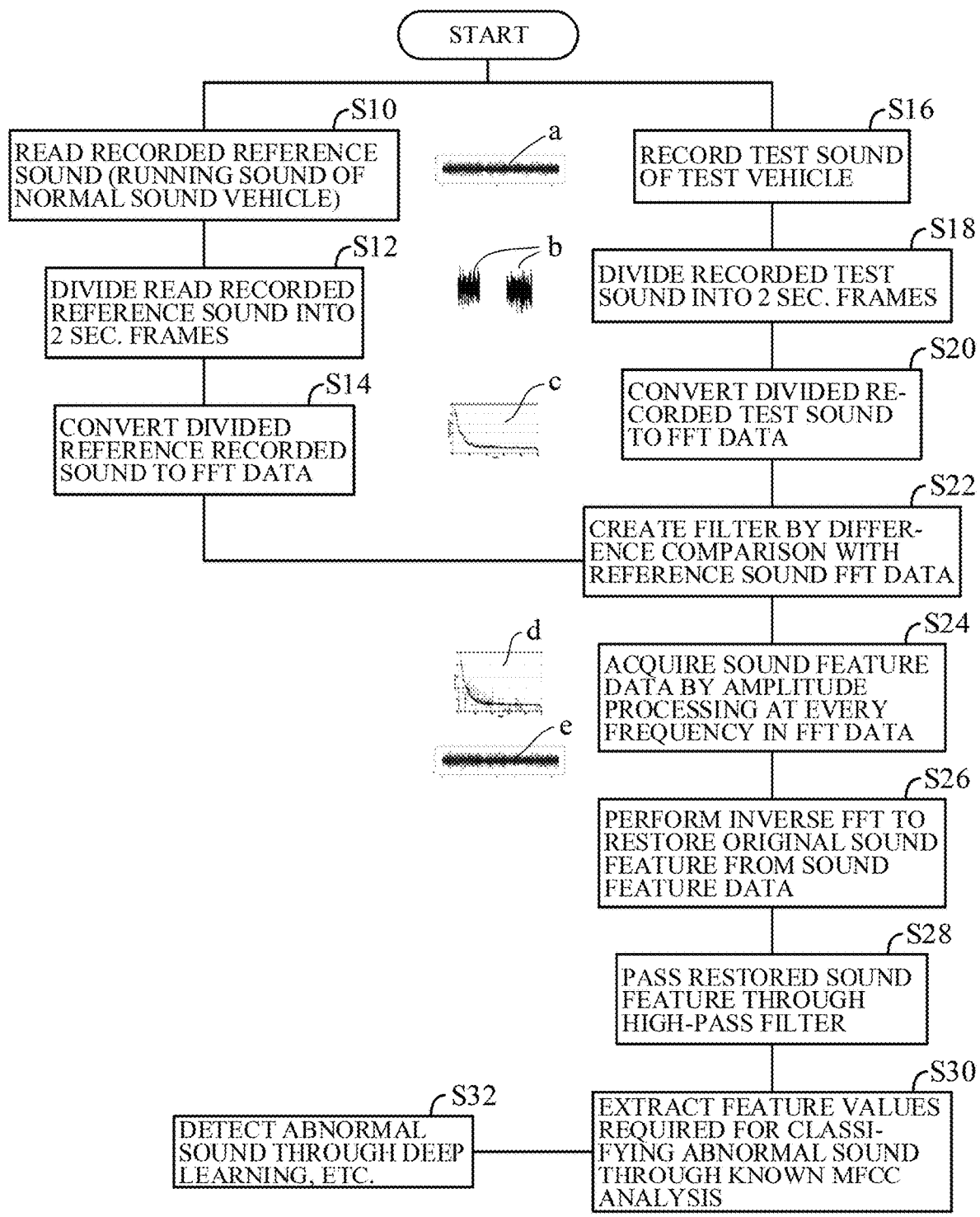
FIG. 2 is a flowchart showing operation of the abnormal sound detection apparatus of FIG. 1.

FIG. 2 is a flowchart showing operation of the abnormal sound detecting apparatus according to this embodiment, namely, operations of the ECU 16.

In the following, explanation of FIG. 2 is preceded by explanation of abnormal sound with reference to FIG. 3 and later drawings.

As stated earlier, "abnormal sound" as termed here means any of various kinds of noise that differ from interior noise during ordinary vehicle running, i.e., differ from regular engine sound, wind sound, road noise and other interior noises heard during ordinary vehicle running, and that are noises that normally should not occur in a properly assembled vehicle, such as detached bolt rolling sound, squeaking, and loose connector rattling.

The causes of abnormal sound occurrence are thus many and various. FIG. 3 shows measurement data of four types of abnormal sound. As examples, sets of measurement data indicating frequency spectral characteristics are shown first (at the top) for rolling sound of stray bolt fallen onto vehicle frame, second for rolling sound of stray bolt fallen onto resin material, third for rattling sound of connector left unconnected, and fourth for body or other squeaking. In the drawing, solid lines indicate reference sound (normal sound vehicle running sound) and broken lines indicate abnormal sound (abnormal sound vehicle running sound; spike, abnormal sound component). The normal sound vehicle and abnormal sound vehicle are hereinafter referred to as "normal vehicle" and "abnormal vehicle".

Since, as seen in the drawing, these abnormal sounds have no particular peaks and their waveforms differ by type, they are hard to detect with a specific algorithm.

Figure 3:
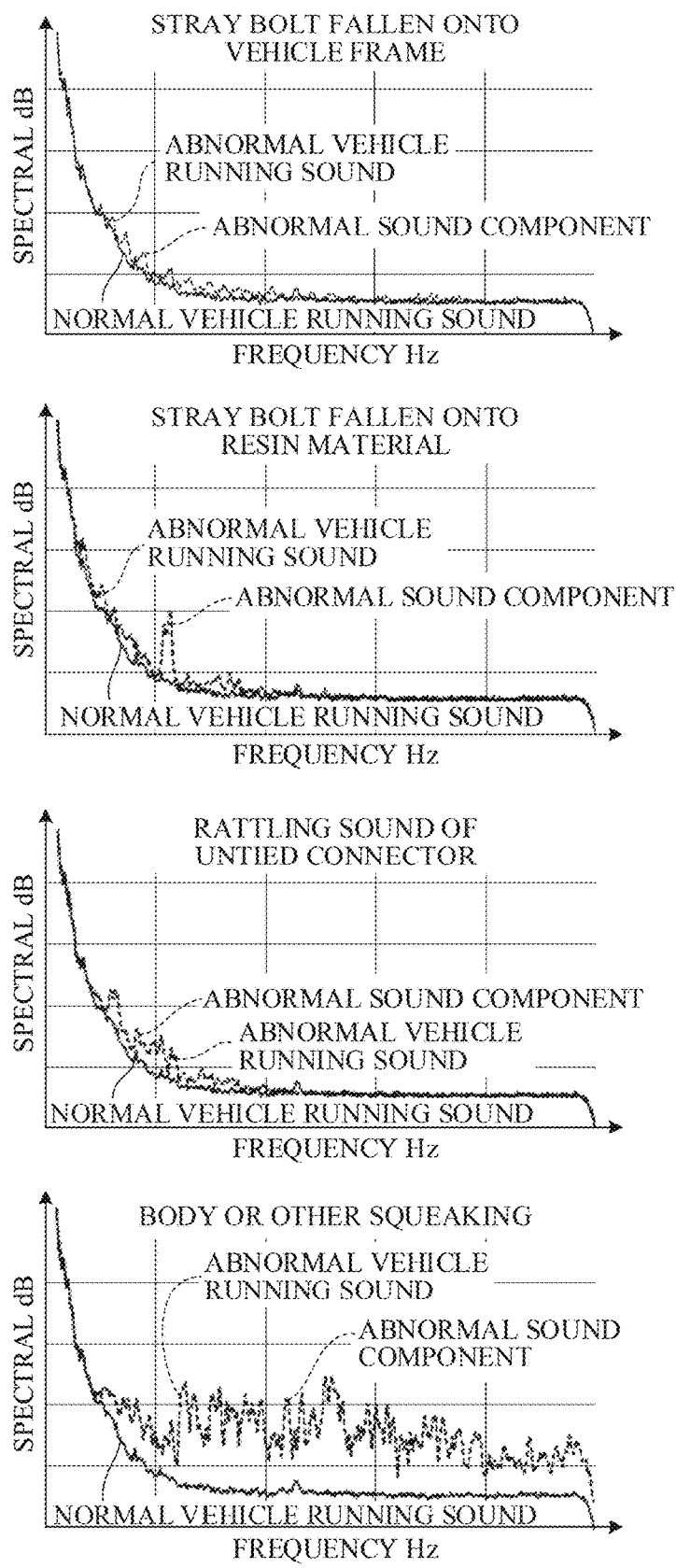
FIG. 3 is a set of explanatory diagrams showing abnormal sounds to be detected by the abnormal sound detection apparatus of FIG. 1.
Figure 4:
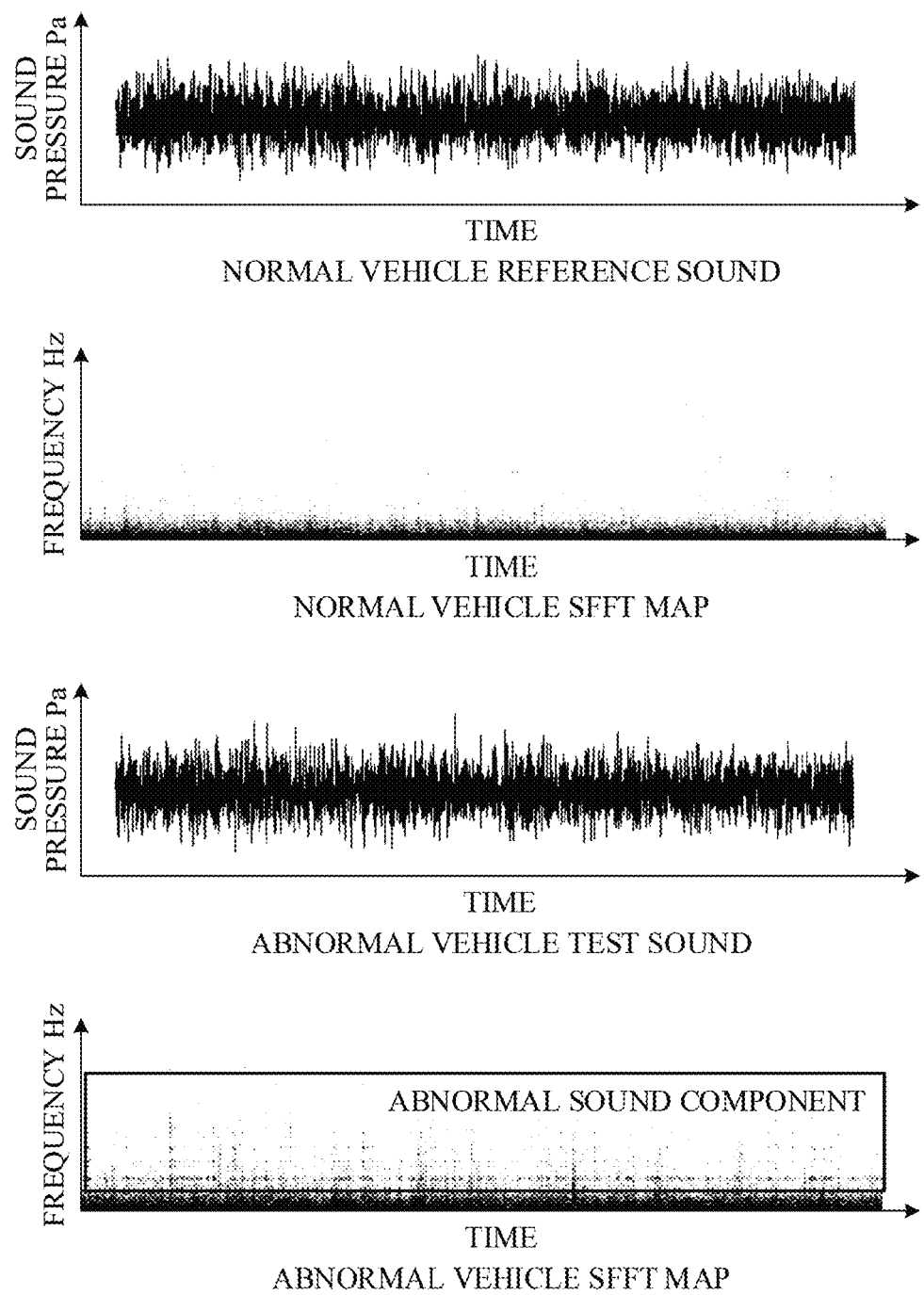
FIG. 4 is a set of explanatory diagrams showing time-sound pressure data and the like measured in a normal sound vehicle and an abnormal sound vehicle with respect to, among the abnormal sounds of FIG. 3, abnormal sound from a stray bolt fallen onto vehicle frame.

FIG. 4 is a set of explanatory diagrams showing time-sound pressure measurement data, and SFFT (map) data of the time-frequency thereof, measured in a normal vehicle and an abnormal vehicle with respect to, among the abnormal sounds of FIG. 3, abnormal sound from a stray bolt fallen onto vehicle frame (uppermost example). In the SFFT (map) data, points represent spectrum, road noise extends across the whole low frequency domain, and road noise energy is shown to be large for both the normal vehicle and the abnormal vehicle. In the abnormal vehicle SFFT (map) data, portions (places) where points appear as streaks in the frequency axis direction are sites where abnormal sound is occurring and show that abnormal sound energy is small relative to low frequency road energy.

Figure 5:
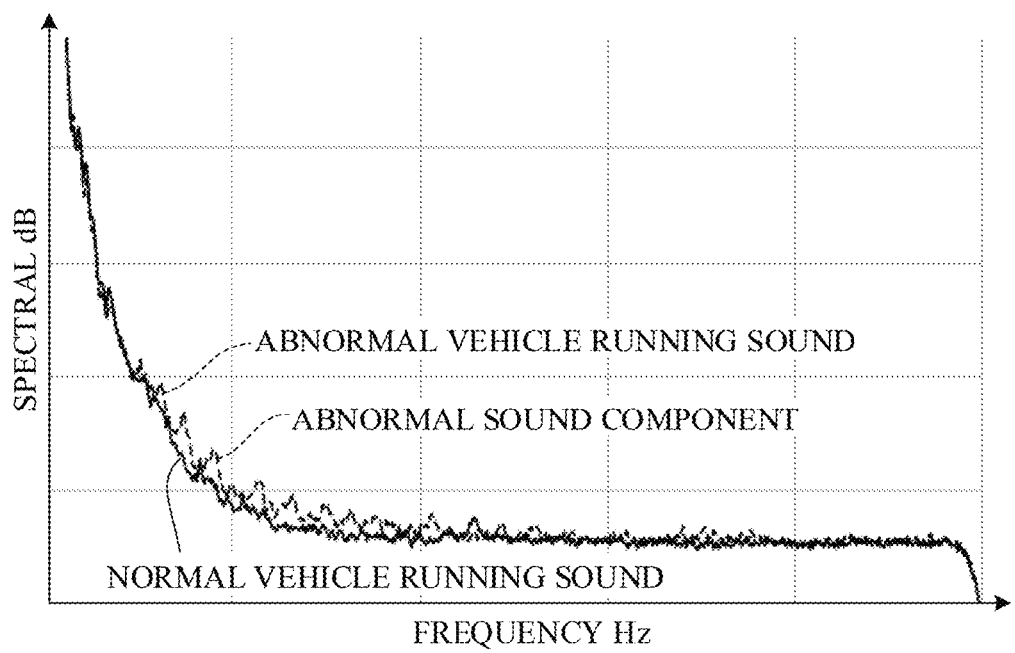
FIG. 5 is an explanatory diagram showing running sound (interior noise) while running on a rough road.

FIG. 5 is a spectral characteristic diagram of abnormal sound from the bolt fallen onto the frame of FIG. 3. As shown in FIG. 5, normal vehicle running sound and abnormal vehicle running sound overlap except at frequencies at which abnormal sound occurs, and since abnormal sound sites on the aforesaid FFT characteristics are therefore also smoothed, difference between normal vehicle running sound and abnormal vehicle running sound is hard to distinguish.

Thus when detecting abnormal sound, normal vehicle road noise and the like also needs to be suppressed. This embodiment is therefore configured to enhance abnormal sound detection accuracy by suppressing noise not required in abnormal sound detection to the utmost possible.

Operation of the abnormal sound detection apparatus according this embodiment is explained with reference to FIG. 2 in the following.

First, in S10, running sound (reference sound; designated by symbol a) recorded in advance over a predetermined time period (e.g., about 30 [s]) from a test vehicle 10 confirmed to be a normal vehicle free of abnormal sound is read from ROM of the memory 16b, whereafter the program goes to S12, in which the read recorded sound is divided into 2 [s] frames, and to S14, in which the divided recorded sound is converted to FFT data by frame and stored in a database of RAM of memory 16b. (S: processing step).

In S16, on the other hand, tested running sound (test sound; same type as running sound designated by symbol a) at time an inspector drives the test object (vehicle 10) on the test track 22 is recorded over a time period equal to the aforesaid predetermined time period. Next, the program goes to S18, in which the recorded tested running sound is, as indicated by symbol b, similarly divided into 2 [s] frames, and to S20, in which the divided recorded sound is converted to FFT data designated by symbol c.

Next, the program goes to S22, in which a filter is created (filtering performed) in accordance with difference comparison with reference sound (normal vehicle running sound) FFT data, and to S24, in which, as indicated by symbol d, sound feature data are acquired by amplitude processing at every frequency in the FFT data region.

Next, in S26, inverse FFT is performed to restore or recover original sound feature from sound feature data. Namely, a well-known inverse Fourier transform formula is used to restore FFT data to original time series signal (sound signal; designated by symbol e). Since the signal obtained by the inverse transform in this case is largely free of bothersome noise unnecessary for detecting abnormal sound, a signal accurately resembling the original time series signal can be newly created.

Next, in S28, the restored original time series signal is passed through a high-pass filter to remove low-frequency components and more completely eliminate noise. The processing of S28 is not absolutely necessary and can be omitted. Moreover, it can be performed by making suitable use of a low pass filter or a band pass filter instead of a high-pass filter.

Next, in S30, feature values required for classifying abnormal sound are extracted from sound signals obtained by performing known MFCC (Mel Frequency Cepstral Coefficient) analysis. The reason for performing inverse FFT in S26 is that MFCC is frequency analysis similar to FFT. Another analysis method can be optionally used instead of MFCC.

Next, in S32, deep learning or other machine learning is performed to detect abnormal sound (determine whether abnormal sound is present).

This processing is explained below with reference to FIG. 6 and later drawings.

Figure 6:
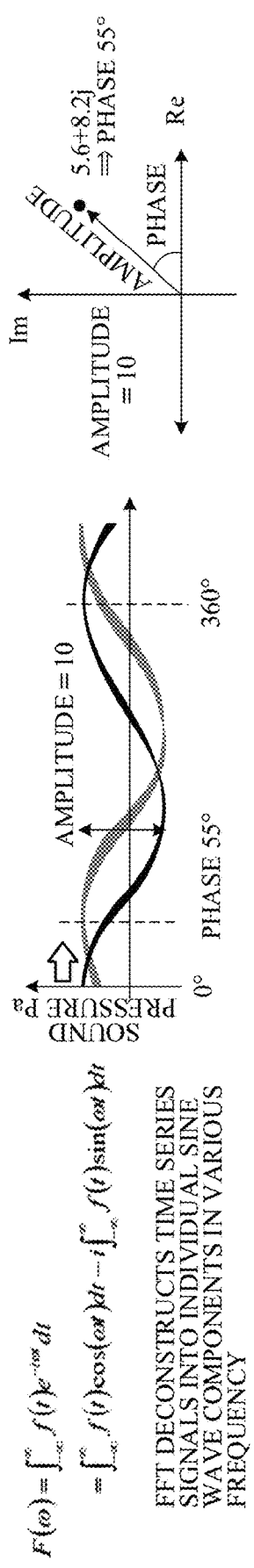
FIG. 6 is a set of explanatory diagrams explaining formula and phase-amplitude of FFT used in abnormal sound detection, and showing complex number expression values at time of certain amplitudes and phases.

FIG. 6 is a set of explanatory diagrams explaining FFT transform formula and phase-amplitude, and showing complex number expression values at time of certain amplitudes and phases (e.g., phase 55° at amplitude 10). An FFT transform formula is a formula that deconstructs time series signals into individual sine wave components in various frequencies.

Figure 7:
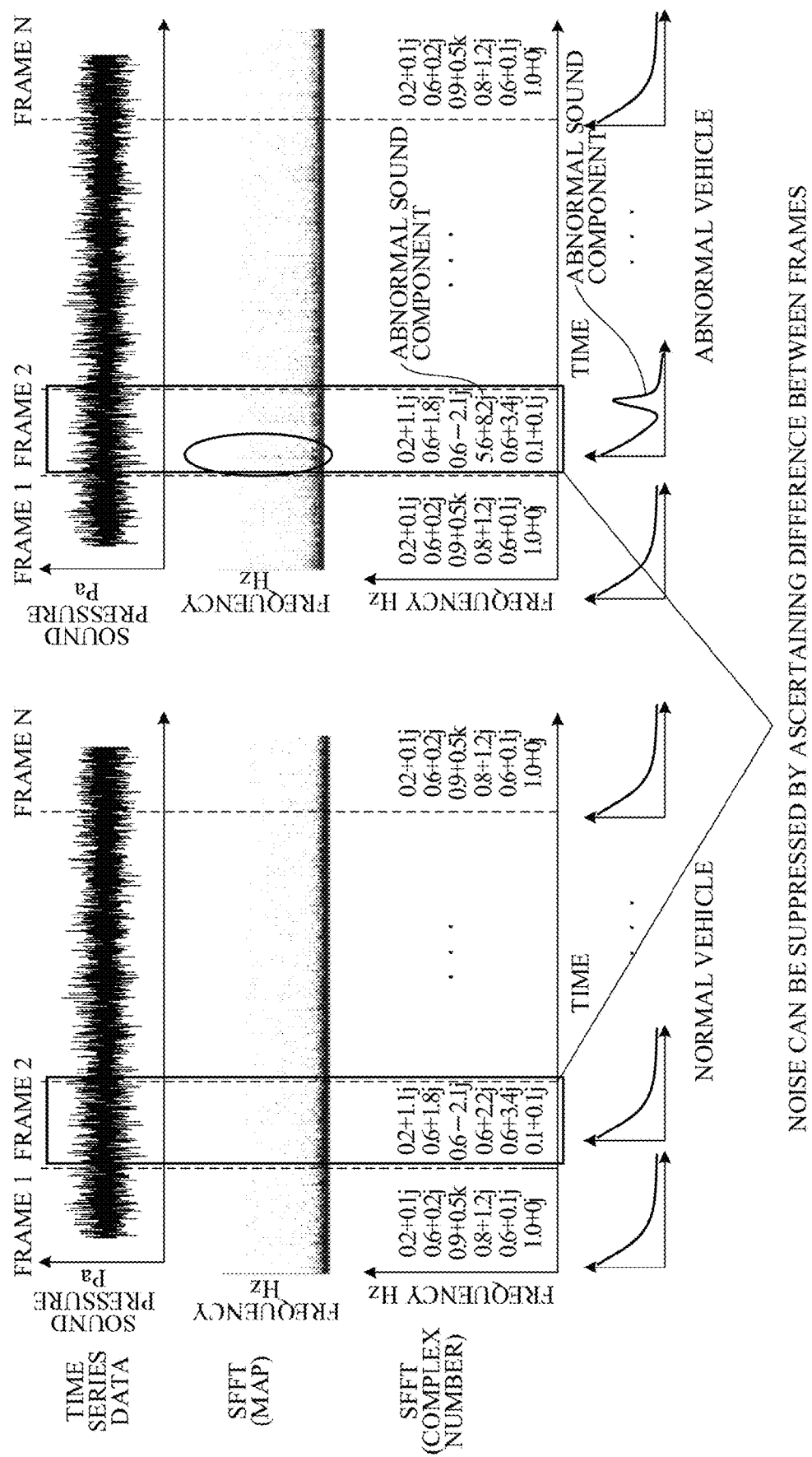
FIG. 7 is a set of explanatory diagrams showing normal sound vehicle and abnormal sound vehicle time sequence data, FFT maps, and multiple expression values.
Figure 8:
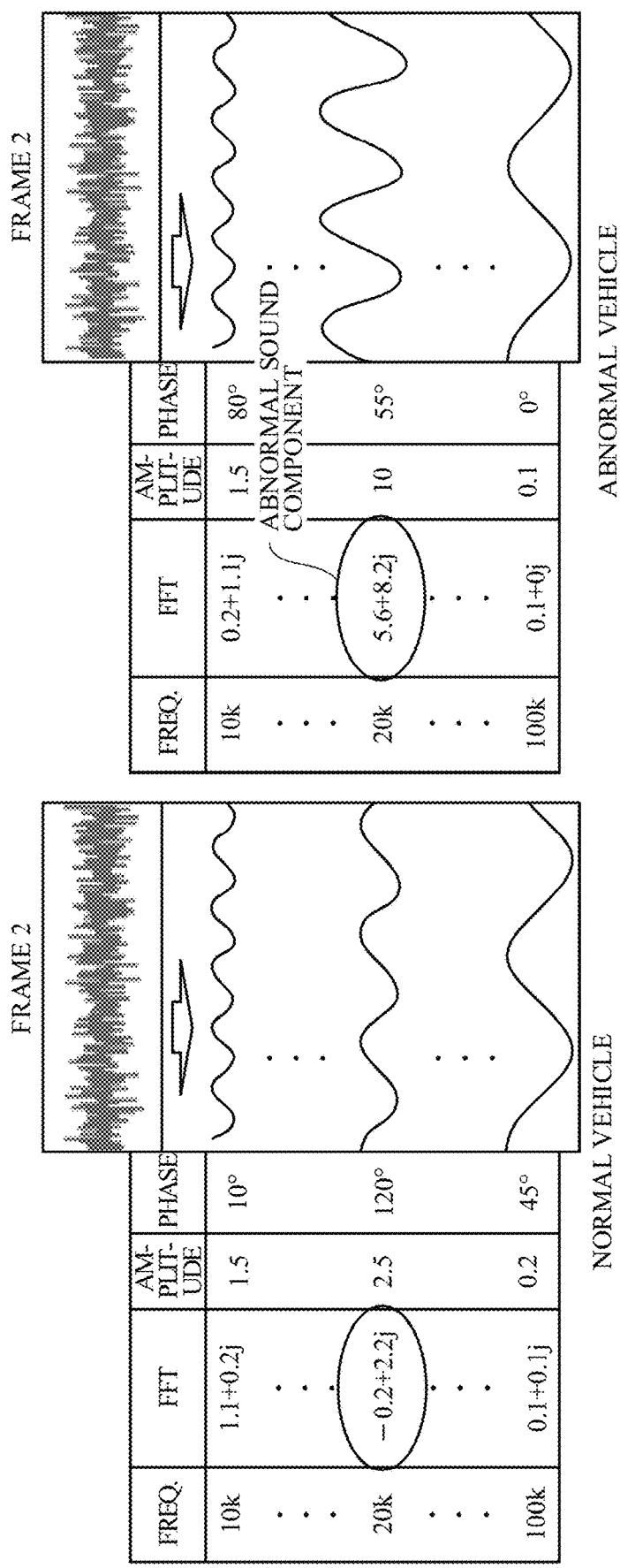
FIG. 8 is a set of explanatory diagrams showing excerpts taken from FIG. 7.
Figure 9:
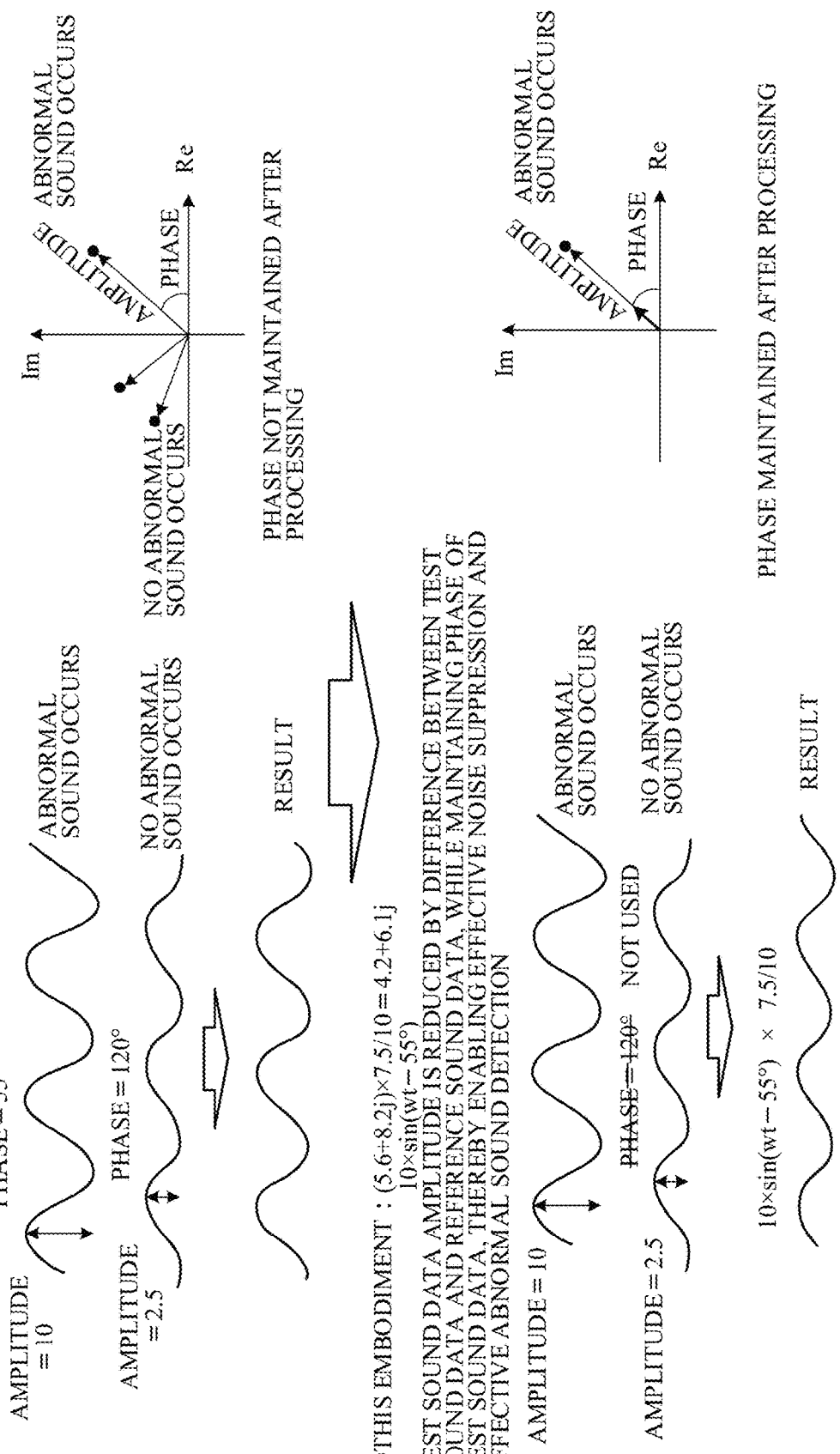
FIG. 9 is a set of explanatory diagrams showing difference calculation method according to this embodiment.

FIG. 7 is a set of explanatory diagrams contrasting normal vehicle and abnormal vehicle time-series data, SFFT maps, and complex number expression values. Symbol n (n=1, 2 . . . N) affixed to frames in FIG. 7 indicate frame order. SFFT is performed on every frame (2 [s]). FIG. 8 is a set of explanatory diagrams showing excerpts taken from FIG. 7. FIG. 9 is a set of explanatory diagrams showing difference calculation method according to this embodiment.

As pointed out earlier, improvement of abnormal sound detection accuracy requires noise occurring even in the normal vehicle to be minimized as much as possible. By applying his knowledge and experience, the inventor achieved this invention based on the thinking that noise can be effectively minimized by, in the normal vehicle data (reference sound data) and abnormal vehicle data (test sound data), properly ascertaining difference between the two in frames that exhibit abnormal sound components.

For example, assume that, as shown in FIGS. 7 and 8, abnormal sound component appears in frame 2. As indicated at circled numeral 1 in FIG. 9, when only amplitude is used in this case, a difference can be observed but noise cannot be effectively suppressed because phase data are discarded.

Moreover, as indicated at circled numeral 2 in FIG. 9, when simple difference is used, noise cannot be effectively suppressed and sound feature sound quality changes because, as indicated by the complex plane on the right side, phase shift cannot be canceled.

In this embodiment, therefore, as indicated at circled numeral 3 in FIG. 9, test sound data amplitude is reduced in accordance with difference between test (abnormal vehicle) sound data and reference (normal vehicle) sound data, while maintaining phase of test sound data. In other words, a configuration is adopted that changes test sound data amplitude based on reference sound data amplitude. Still more specifically, a configuration is adopted that changes test sound data amplitude based on ratio of difference between test sound data amplitude and reference sound data amplitude to test sound data amplitude.

Therefore, as seen from the complex plane on the right side, avoidance of change in phase data ensures that no change occurs in recovered sound feature sound quality, thereby enabling effective noise suppression. Namely, since noise components are removed from the sound feature, noise suppression is effectively achieved and effective detection of abnormal sound also from noise is made possible.

In this embodiment, test (abnormal vehicle) sound data are, in the frequency components of every frame, reduced with phase maintained unchanged in accordance with difference relative to reference (normal vehicle) sound data. Optionally, a low-frequency frequency band below a predetermined frequency (e.g., 500 [Hz]) can be omitted because it consists almost entirely of engine sound. In other words, a configuration can be adopted that compares test sound data and the reference sound data in frequency bands the same as the frequency bands exceeding the predetermined frequency.

Figure 10:
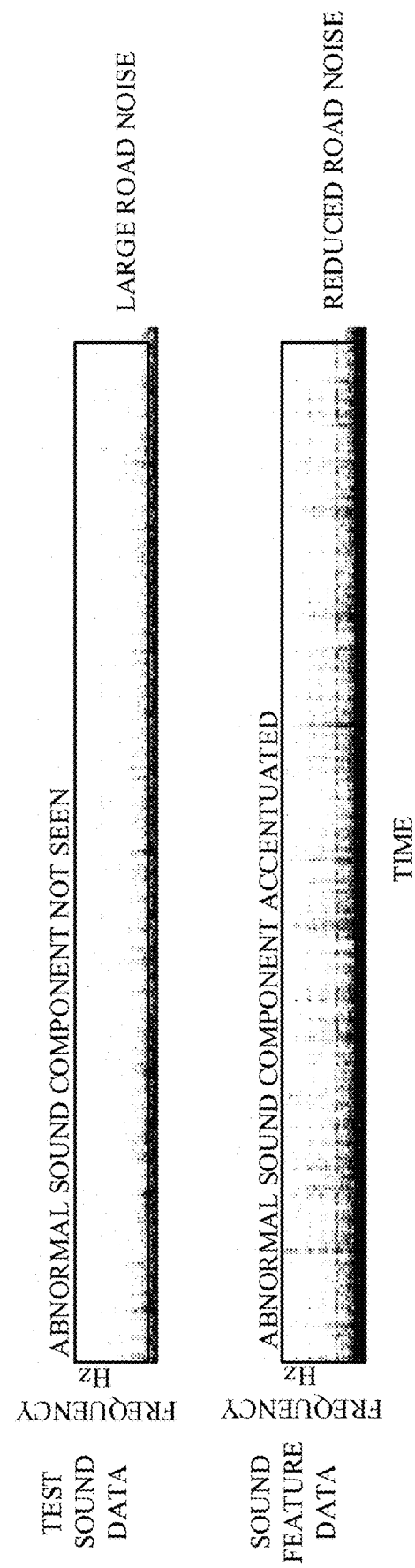
FIG. 10 is an explanatory diagram showing test sound data and the like of FIG. 2.

FIG. 10 shows original test sound data (original data) and sound feature data with abnormal sound components accentuated by the aforesaid processing. Although noise (road noise components) is large in the original tested sound data, it can be seen to be reduced in the sound feature data obtained by the aforesaid processing.

Figure 11:
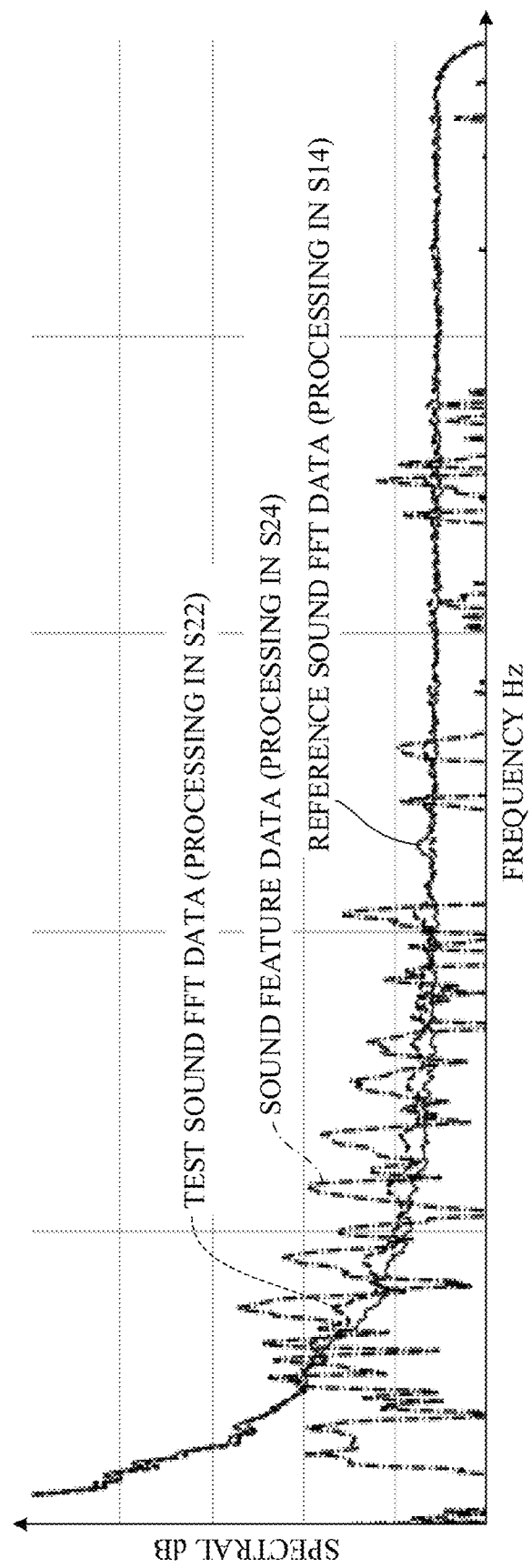
FIG. 11 is an explanatory diagram showing sound feature data and the like of FIG. 2.

FIG. 11 shows test sound and other data of FIG. 2 expressed as frequency spectra. In the drawing, solid lines indicate reference sound FFT data, broken lines indicate test sound FFT data, and one-dot-dashed lines indicate sound feature data.

Again resuming explanation of the flowchart of FIG. 2, sound feature data of FIG. 11 are high-pass filtered in S28 and MFCC analyzed in S30, whereafter abnormal sound is detected in S32 by performing deep learning or other machine learning based on the MFCC analyzed sound feature data.

It should be noted that the abnormal sound detection (determining whether abnormal sound is present) is not limited to the aforesaid. Alternatively, detection can be performed by comparison with the reference sound data discussed with reference to FIG. 11, or by in addition sequentially storing sound feature data (or recovered feature sound) in the database at every abnormal sound detection, comparing recorded test sound data and stored sound feature data (or restored sound feature), and determining abnormal sound to be present when the two are identical or similar.

As set out in the foregoing, this embodiment is configured to have an abnormal sound detection apparatus (or abnormal sound detection method) for detecting abnormal sound of a test object (the vehicle 10), which (abnormal sound detection apparatus or abnormal sound detection method) comprises: a reference sound data recording unit (16a1) or reference sound data recording steps (S10 to S14) configured to record as reference data having phase and amplitude in each of multiple frequency bands reference sounds of types not previously recorded as abnormal sounds in the test object (vehicle 10) similar to the test object concerned; a test sound data acquisition unit (16a2) or test sound data acquisition steps (S16 to S20) configured to acquire test sound data having phase and amplitude in the multiple frequency bands from test sounds generated by the test object; a sound feature data acquisition unit (16a3) or sound feature data acquisition (steps S22 to S24) configured to acquire sound feature data by comparing the test sound data with reference sound data in frequency bands the same as the multiple frequency bands and by changing amplitude of the test sound data based on amplitude of the reference sound data while maintaining phase of the test sound data; and an abnormal sound detection unit (16a4) or abnormal sound detection steps (S26 to S32) configured to detect abnormal sound based on the acquired sound feature data.

Thus a configuration is adopted that compares test sound data and reference sound data in frequency bands same as the multiple frequency bands, acquires sound feature data by changing amplitude of test sound data based on amplitude of reference sound data while maintaining phase of test sound data, and detects abnormal sound based on acquired sound feature data. With this, since noise components are removed from the sound feature, noise suppression is effectively achieved and effective detection of abnormal sound also from noise during normal driving sound is made possible.

Moreover, a configuration is adopted wherein the abnormal sound detection unit (16a4) or abnormal sound detection steps (S24 to S30) has a conversion unit (16a41) or conversion steps (S26 to S32) configured to convert sound feature data acquired by the sound feature data acquisition unit (16a3) to a sound feature sound signal, and abnormal sound is detected based on the converted sound feature sound signal, whereby, in addition to realizing the aforesaid effects, abnormal sound can be detected with higher accuracy by performing, for example, MFCC analysis of the sound feature.

Moreover, a configuration is adopted wherein the sound feature data acquisition unit (16a3) or sound feature data acquisition steps (S22 to S24) is configured to acquire the sound feature data by changing amplitude of the test sound data based on ratio of amplitude of the test sound data amplitude to amplitude of the reference sound data, whereby, in addition to realizing the aforesaid effects, abnormal sound can be detected with higher accuracy.

Moreover, a configuration is adopted wherein the abnormal sound detection unit (16a4) or abnormal sound detection steps (S26 to S32) has a learning unit (16a42) or learning step (S32) configured to perform machine learning of the sound feature sound signal converted by the conversion unit (16a41) or conversion steps (S26 to S32), whereby, in addition to realizing the aforesaid effects, abnormal sound can be detected with higher accuracy by deep learning or other machine learning.

Moreover, a configuration is adopted wherein the sound feature data acquisition unit (16a3) or sound feature data acquisition steps (S22 to S24) is configured to compare the test sound data and the reference sound data in frequency bands same as frequencies higher than the multiple predetermined frequencies, whereby, in addition to realizing the aforesaid effects, amount of computation can be reduced.

Moreover, a configuration is adopted wherein the abnormal sound detection apparatus has an electronic control unit (ECU) constituted of a microcomputer equipped with at least the one processor (CPU) 16a and at least one memory 16b formed of ROM, RAM and the like coupled to the processor 16a, and the processor 16a configured to operate in accordance with a program stored in the memory 16b to record reference sound not exhibiting the abnormal sound in a test object (vehicle 10) of the same type as the test object as reference sound data having phase and amplitude in multiple frequency bands (S10 to S14), acquire from test sound generated by the test object test sound data having phase and amplitude in each of the multiple frequency bands (S16 to S20), compare the test sound data and the reference sound data in frequency bands same as the multiple frequency bands and acquire sound feature data by changing amplitude of the test sound data based on amplitude of the reference sound data while maintaining phase of the test sound data (S22 to S24), and detect the abnormal sound based on the acquired sound feature data (S26 to S32).

Although the foregoing description relates to a case of using FFT data as time-frequency characteristic data, this is not a limitation and use of wavelet conversion is also possible. Moreover, the microphones 12 are not limited to the number in the example shown in FIG. 1.

While the present invention has been described with reference to the preferred embodiments thereof, it will be understood, by those skilled in the art, that various changes and modifications may be made without departing from the scope of the appended claims.

What is claimed is:

1. An apparatus for detecting abnormal sound of a test object, comprising:
   a reference sound data recording unit configured to record as reference data having phase and amplitude in each of multiple frequency bands reference sounds of types not previously recorded as abnormal sounds in the test object similar to the test object;
   a test sound data acquisition unit configured to acquire test sound data having phase and amplitude in the multiple frequency bands from test sounds generated by the test object;
   a sound feature data acquisition unit configured to acquire sound feature data by comparing the test sound data with reference sound data in frequency bands the same as the multiple frequency bands and by changing amplitude of the test sound data based on amplitude of the reference sound data while maintaining phase of the test sound data;
   and
   an abnormal sound detection unit configured to detect abnormal sound based on the acquired sound feature data.

2. The apparatus according to claim 1, wherein the abnormal sound detection unit has a conversion unit configured to convert sound feature data acquired by the sound feature data acquisition unit to a sound feature sound signal, and abnormal sound is detected based on the converted sound feature sound signal.

3. The apparatus according to claim 1, wherein the sound feature data acquisition unit is configured to acquire the sound feature data by changing amplitude of the test sound data based on ratio of amplitude of the test sound data amplitude to amplitude of the reference sound data.

4. The apparatus according to claim 2, wherein the abnormal sound detection unit has a learning unit configured to perform machine learning of the sound feature sound signal converted by the conversion unit.

5. The apparatus according to 1, wherein the sound feature data acquisition unit is configured to compare the test sound data and the reference sound data in frequency bands same as frequencies higher than the multiple predetermined frequencies.

6. The apparatus according to claim 1, wherein the test object is a vehicle.

7. A method for detecting abnormal sound of a test object, comprising the steps of:
   recording as reference data having phase and amplitude in each of multiple frequency bands reference sounds of types not previously recorded as abnormal sounds in the test object similar to the test object;
   acquiring test sound data having phase and amplitude in the multiple frequency bands from test sounds generated by the test object;
   acquiring sound feature data by comparing the test sound data with reference sound data in frequency bands the same as the multiple frequency bands and by changing amplitude of the test sound data based on amplitude of the reference sound data while maintaining phase of the test sound data; and
   detecting abnormal sound based on the acquired sound feature data.

8. The method according to claim 7, wherein the step of abnormal sound detection has the step of:
   converting sound feature data acquired by the step of sound feature data acquisition to a sound feature sound signal, and abnormal sound is detected based on the converted sound feature sound signal.

9. The method according to claim 7, wherein the step of sound feature data acquisition is configured to acquire the sound feature data by changing amplitude of the test sound data based on ratio of amplitude of the test sound data amplitude to amplitude of the reference sound data.

10. The method according to claim 8, wherein the step of abnormal sound detection has the step of:
    performing machine learning of the sound feature sound signal converted by the step of conversion.

11. The method according to 7, wherein the step of sound feature data acquisition is configured to compare the test sound data and the reference sound data in frequency bands same as frequencies higher than the multiple predetermined frequencies.

12. The method according to claim 7, wherein the test object is a vehicle.

13. An apparatus for detecting abnormal sound of a test object, comprising:
    an electronic control unit constituted of a microcomputer equipped with at least one processor and at least one memory coupled to the processor;
    wherein the processor is configured to:
    record as reference data having phase and amplitude in each of multiple frequency bands reference sounds of types not previously recorded as abnormal sounds in the test object similar to the test object;
    acquire test sound data having phase and amplitude in the multiple frequency bands from test sounds generated by the test object;
    acquire sound feature data by comparing the test sound data with reference sound data in frequency bands the same as the multiple frequency bands and by changing amplitude of the test sound data based on amplitude of the reference sound data while maintaining phase of the test sound data; and
    detect abnormal sound based on the acquired sound feature data.

14. The apparatus according to claim 13, wherein the processor is configured to convert sound feature data to a sound feature sound signal, and abnormal sound is detected based on the converted sound feature sound signal.

15. The apparatus according to claim 13, wherein the processor is configured to acquire the sound feature data by changing amplitude of the test sound data based on ratio of amplitude of the test sound data amplitude to amplitude of the reference sound data.

16. The apparatus according to claim 14, wherein the processor is configured to perform machine learning of the sound feature sound signal.

17. The apparatus according to 3, wherein processor is configured to compare the test sound data and the reference sound data in frequency bands same as frequencies higher than the multiple predetermined frequencies.

18. The apparatus according to claim 13, wherein the test object is a vehicle.

* * * * *